May 19, 1936. H. E. SOMES 2,040,884
OVEN AND SYSTEM OF VENTILATION THEREFOR
Filed Dec. 20, 1934 3 Sheets-Sheet 1
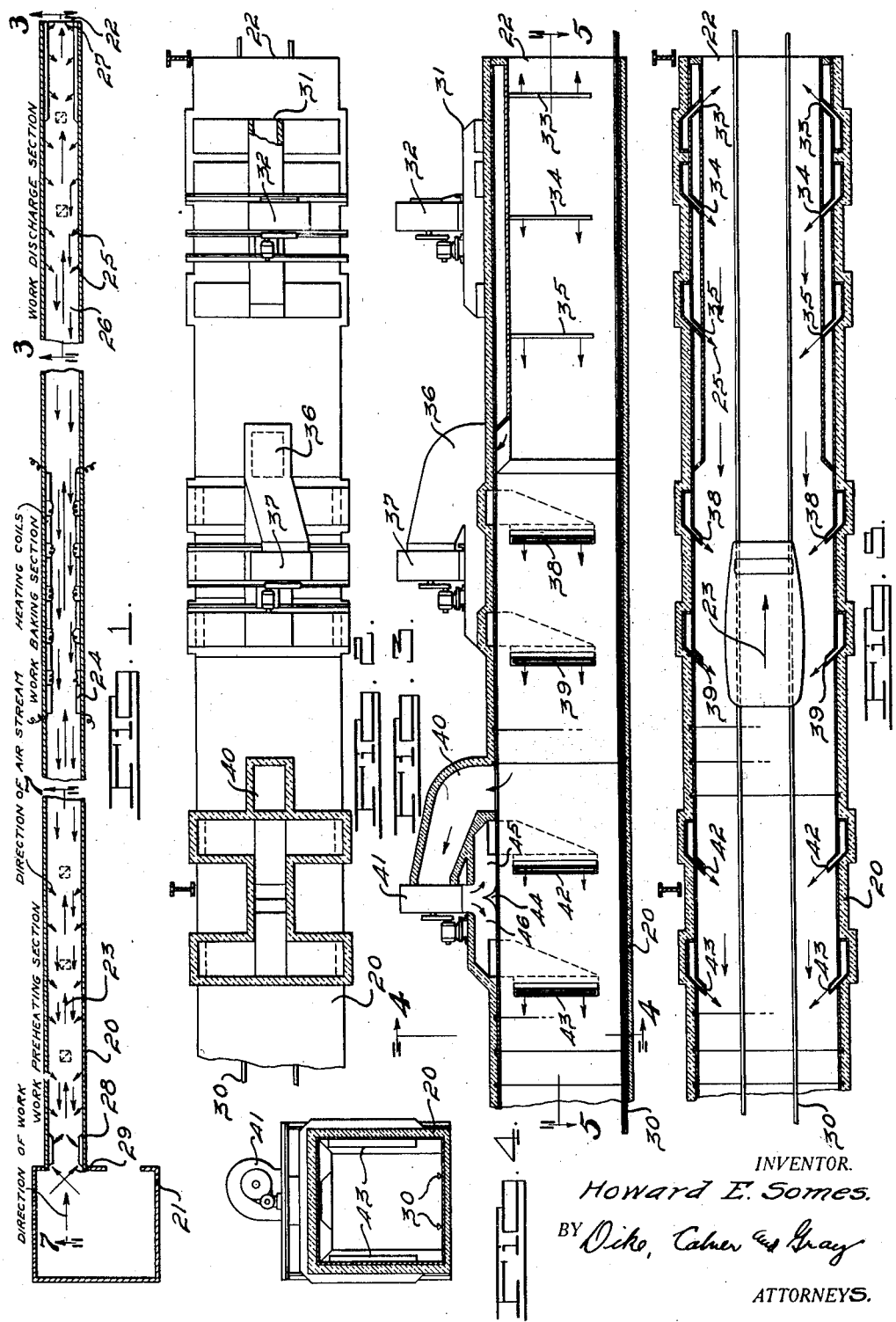
INVENTOR.
Howard E. Somes.
BY Dike, Calver and Gray
ATTORNEYS.

May 19, 1936.   H. E. SOMES   2,040,884
OVEN AND SYSTEM OF VENTILATION THEREFOR
Filed Dec. 20, 1934   3 Sheets-Sheet 2
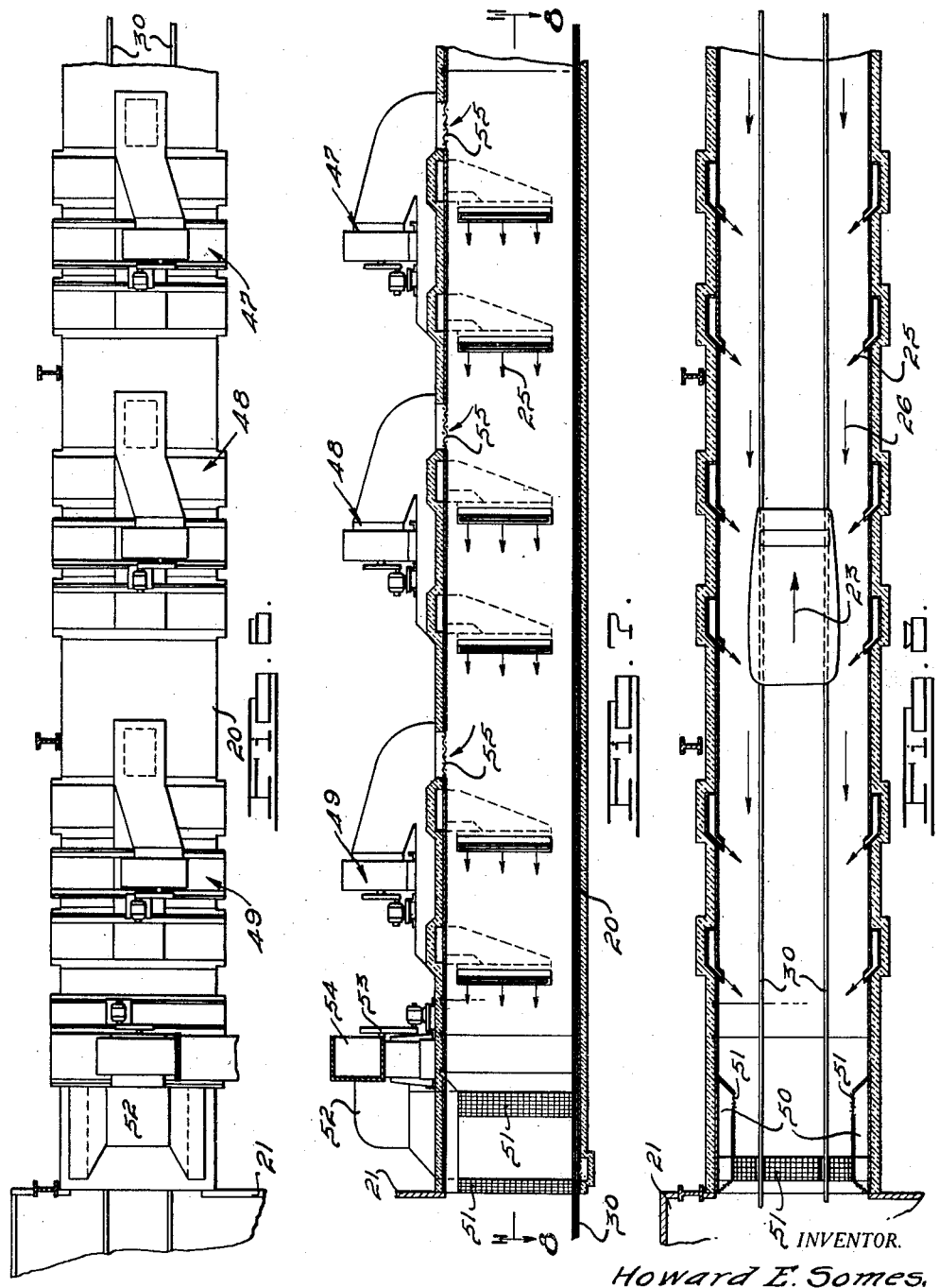
INVENTOR.
Howard E. Somes.
BY Dike, Calver and Gray
ATTORNEYS.

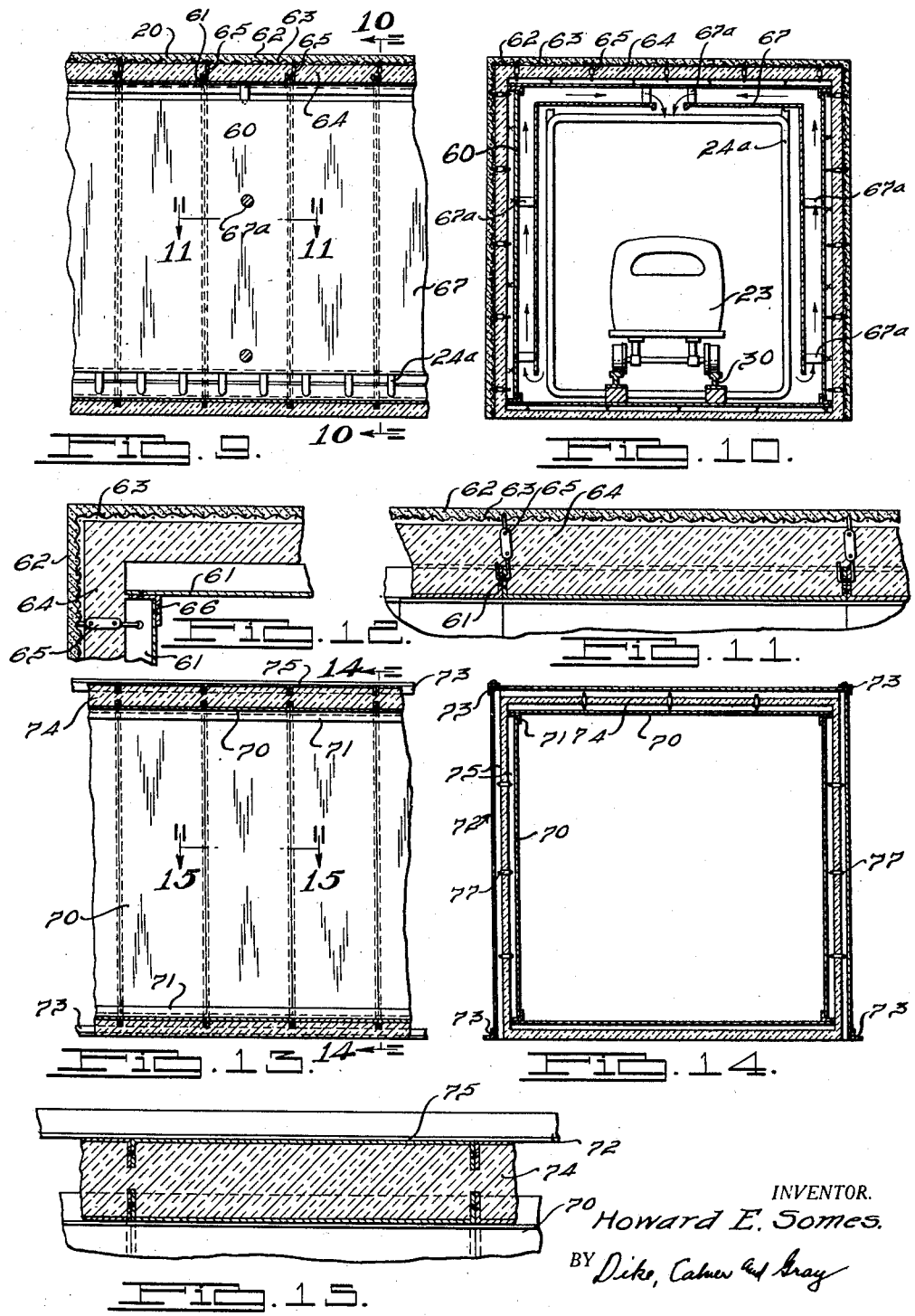

Patented May 19, 1936

2,040,884

UNITED STATES PATENT OFFICE 2,040,884

OVEN AND SYSTEM OF VENTILATION THEREFOR

Howard E. Somes, Detroit, Mich.

Application December 20, 1934, Serial No. 758,413

3 Claims. (Cl. 219—47)

The present invention relates to a heating and ventilating system for industrial type ovens and particularly to such ovens of the enclosed tunnel type. Ovens of this type are used commercially for such purposes as baking finishes on metal objects, such for example as the synthetic enamel finishes in which modified "glyptal" resins are used. Such ovens are of particular value in baking finishes of this type upon motor vehicle bodies or the like. Ovens of this general type also may be used for the heat treatment of metal objects or the surfaces thereof.

In a typical installation a conveyor extends longitudinally of the enclosing tunnel and carries the objects to be treated through progressive stages within the oven, which are hereinafter designed as work preheating section, work baking section and work discharge section. Objects entering the oven in the work preheating section usually are at or about atmospheric temperature but are heated gradually while within this section to elevated temperatures. Thereafter, the objects pass to the work baking section where they are heated to the predetermined degree of heat required for the particular desired treatment. Thereafter the objects pass through the work discharge section and are cooled to a temperature below the temperature in the work baking section. Upon discharge from the oven the objects may have been cooled to a temperature approximately atmospheric, if such treatment is desired. The objects undergoing treatment thus comprise a continually moving stream flowing from the intake end of the enclosing tunnel to the discharge end of the tunnel and pass through the respective sections therein provided.

Prior to the present invention ovens of this type were heated by the use of gas or steam as the heating medium. This, however, was not entirely satisfactory particularly in installations requiring accurate temperature control within close limits, nor was it fully satisfactory in installations used in baking finishes on metal objects where the presence of suspended foreign matter within the air inside the oven would impair the finish coat on the article. Also, no provision was made in such ovens for the positive circulation of air in predetermined circuits so as to bring the air in contact with all portions of the work passing through the oven. Nor was provision made for a definite direction of the air flow in the oven. The use of electrically actuated heating means has heretofore been suggested but has not been universally adopted because of the relatively higher cost per heat unit resulting from electrical current over that of heat units produced by gas or steam heat. The present invention provides a heating oven so designed as to increase its efficiency and make feasible the economical and commercial use of electricity as a heating medium therefor.

It is the principal object of the present invention to provide a heating and ventilating system for commercial ovens of the enclosed tunnel type in which electric current is used to supply the heating therefor and wherein provision is made for a positive circulation of clean air through the oven and in intimate contact with all surfaces of the objects passing therethrough.

It is a further object of the present invention to provide a heating and ventilating system for commercial ovens of the tunnel type in which heat units are transferred to and from work passing through the oven by utilizing circulated air passing in circuits through the oven as the heat transference medium. This results in a gradual increase of temperature in the work in the work preheating section and a gradual decrease of the temperature of the work in the work discharging section. The utilization of such circulating air to transfer a predeterminable and controllable quantity of heat, absorbed from the hot work as it leaves the oven, to the cold work as it enters the oven, effects a heat control within the oven which is regulated by the quantity of fresh air taken into the oven in accordance with the quantity of heat units taken out of the oven by the hot work.

Other objects of this invention will appear in the following description and appended claims, reference being had to the accompanying drawings forming a part of this specification wherein like reference characters designate corresponding parts in the several views.

Fig. 1 is a fragmentary schematic view of an oven having a heating and ventilating system of the present invention, Fig. 2 is a top plan view, partially in section, of the work discharge section of the oven included within the arrows 3—3 of Fig. 1.

Fig. 3 is a longitudinal sectional view taken substantially on the line 3—3 of Fig. 1 in the direction of the arrows.

Fig. 4 is a cross sectional view taken substantially on the line 4—4 of Fig. 3 in the direction of the arrows.

Fig. 5 is a longitudinal section taken substantially on the line 5—5 of Fig. 3 in the direction of the arrows.

Fig. 6 is a top plan view of the work preheating section of the oven included within the arrows 7—7 of Fig. 1.

Fig. 7 is a longitudinal section taken substantially on the line 7—7 of Fig. 1 in the direction of the arrows.

Fig. 8 is a longitudinal section taken substantially on the line 8—8 of Fig. 7 in the direction of the arrows.

Fig. 9 is a fragmentary elevation, partially in section, taken through a portion of the work baking section of the tunnel and showing certain details of the construction thereof.

Fig. 10 is a cross sectional view through the work baking section of the oven and taken substantially on the line 10—10 of Fig. 9 in the direction of the arrows.

Fig. 11 is a fragmentary sectional view taken substantially on the line 11—11 of Fig. 9 in the direction of the arrows.

Fig. 12 is an enlarged fragmentary sectional view showing the details of the corner construction.

Fig. 13 is a view similar to Fig. 9 showing a modified form of wall construction.

Fig. 14 is a sectional view taken substantially on the line 14—14 of Fig. 13 in the direction of the arrows.

Fig. 15 is a fragmentary sectional view taken substantially on the line 15—15 of Fig. 13 in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings and particularly to Fig. 1, 20 designates the enclosing walls forming the tunnel of a commercial type oven to which the present invention appertains. A receiving booth 21 is provided at the entrance end of the tunnel and the work, after traversing the tunnel, is discharged through the discharge end 22. The work travels through the tunnel in the direction of the arrows 23 and is heated by means of electrically actuated heating coils 24 (of any preferred type, as for example resistance heating units or induction heating units) placed at suitable predetermined intervals within the enclosing tunnel. In accordance with the present invention, air is discharged through a series of discharge ports in the walls of the tunnel in the direction designated by the arrows 25. After meeting the work the air then passes through the tunnel in the direction of the arrows 26 in counterflow to the direction of the work passing therethrough.

Adjacent the discharge end 22 of the tunnel the air is directed outwardly in the direction of the arrows 27 to form an air curtain and so prevent the suction of air inwardly through the discharge end of the tunnel. At the entrance end of the tunnel the air is withdrawn from the tunnel in the direction of the arrows 28 from the entrance booth 21 designated by the arrows 29 and forms an air curtain which surrounds the work as it passes into the tunnel in such a manner as to prevent the discharge of air from the tunnel into the work receiving portion 21.

A conveyor 30 extends longitudinally throughout the length of the oven and may be of any desired type such as the overhead rail type or the type as here shown which is a fixed conveyor in the form of rails on the floor of the oven along which the work is passed while carried on a suitable carrier mechanism. The work passes along the conveyor 30, as has been said, in the direction of the arrows 23, that is, from the work preheating section to the work baking section and thereafter to the work discharge section in the oven.

The ventilating system of the present invention is provided with intake ports 31 which communicate with the atmosphere outside of the oven. Air is drawn through the intake port 31 by the blower 32 from which it is discharged through a series of ducts and discharge ports 33, 34 and 35 which open into the interior of the enclosing tunnel. As shown by the arrows of Figs. 3 and 5, the air from the port 33 is discharged toward the discharge opening 22 in converging streams which form the air curtain heretofore mentioned as preventing the drawing of air into the tunnel through the discharge opening 22. The air from the ports 34 and 35 is discharged inwardly and toward the entrance end of the tunnel, as shown by the direction of the arrows in Figs. 3 and 5. In order to provide a constant circulation of the air within the oven, a series of blowers and communicating ducts are provided, such as shown by way of example in Fig. 3. As there shown, the air which is discharged through the ducts 34 and 35 is drawn upwardly through the top of the oven through a duct 36 which communicates with a blower 37 which communicates with a series of ducts and discharges the air through the ports 38 and 39 in the direction of the arrows as shown in Figs. 3 and 5. As shown in Fig. 5, the streams of air passing through the ducts 38 and 39 contact with all portions of the work passing through the oven, after which the air is then withdrawn from the top of the oven through the duct 40 communicating with the blower 41, which in turn communicates with a series of ducts to discharge the air through the ports 42 and 43, inwardly and toward the work, as shown by the direction of the arrows of Figs. 3 and 5.

A duct construction which may be used satisfactorily in connection with any of the systems of ducts and blowers used in connection with the present invention is shown in Fig. 3 and comprises a member 44 which extends upwardly in a duct to provide a throat which separates the two ducts 45 and 46, the duct 45 communicating through suitable ducts with the port 42 and the duct 46 communicating through suitable feeding ducts with the port 43.

The apparatus heretofore described is such that the air is constantly withdrawn from the top of the oven and is discharged inwardly and toward the entrance end of the oven through the ports provided in the side walls of the oven structure. This type of ventilating system may be employed throughout the length of the oven and prevents stratification of the air within the oven. As here shown, no blower mechanism is provided at the work baking section shown in Fig. 1. This, however, is merely a detail of design which may be varied by those skilled in the art for any given installation.

After the air has been taken into the tunnel and circulated as heretofore described, it passes thence through the work baking section within the oven and thence toward the work preheating section thereof. In the work preheating section, the air is circulated by means of blowers and communicating ducts 47, 48 and 49 which are of similar construction and operation to the ducts and blowers heretofore described. The entrance end of the tunnel is provided with exhaust ports 50 enclosed by a suitable grille or screen 51. The ducts 50 communicate with a duct 52 in which a blower 53 is housed to withdraw the air through the exhaust screens 51, and the ducts 50 and 52, and discharge the exhaust air through a suitable exhaust stack 54.

From the foregoing description of the ventilating system it will be apparent that air at substantially atmospheric temperature is taken into the oven adjacent the work discharge section and is circulated while at this temperature so as to contact with the work during the time that the work retains considerable latent heat. At this point the work has been heated to a considerable degree and the constant circulation of the air at substantially atmospheric temperature around the work cools the work and while so doing heats the air. The heated air thus becomes successively warmer as it is recirculated and passes through the work baking section toward the work preheating section of the oven. During this time the air having passed through the heated work baking section, is so heated that when it comes in contact with the cold work in the work preheating section, the air gives up heat units to the work. Thus the air acts as the heat transfer medium by which the work becomes heated prior to the time that it passes into the work baking section of the oven. Thus it will be seen that the latent heat in the work is utilized for the first heating of the air in the work discharge section and thereafter is further heated in the work baking section, and that heat carried by the air is thereafter utilized to heat the cold work in the work preheating section. During this time the temperature of the air may be regulated by controlling the amounts drawn into the oven.

In certain types of installations, as for example an oven for baking a synthetic enamel finish on an automobile body, this circulation of air in this manner has been found to produce desirable results not only in increasing the efficiency of the oven by effecting the transfer of the heat units as heretofore described, but also in that the cold article is heated by gradual increases in temperature in the work preheating section until it reaches the work baking section, and thereafter is cooled by gradual decreases in temperature. In this manner the work may be discharged at the discharge end of the oven at a temperature slightly in excess of atmospheric temperature. Thus sudden temperature changes either in the work passing into the oven or in the work as it passes from the oven are avoided, with the elimination of the chipping or cracking of such enamel surfaces where such chipping or cracking is due to rapid temperature changes causing a sudden expansion or contraction of the metal object to which the surface is applied.

There is thus a work preheating section, a work baking section and a work discharge section, the latter serving as an air preheating section wherein the incoming air will remove from the heated work a given quantity of heat. This saved heat is carried by the air into the work baking section where some additional heat is absorbed by the air, and then the air stream enters the work preheating section where the cooled work removes from the heated air the heat picked up by the air in the oven and some part of the heat previously absorbed by the air in the work discharge section. The amount of air entering the oven is controlled so that the temperature of the work preheating section shall be just high enough to avoid condensation, on the incoming cool work, of any liquids carried by the air in vapor form. Another way of stating the temperature balance, is to say that the temperature of the outgoing work shall be substantially equal to the temperature of the outgoing air.

The oven heating may be accomplished in any manner which does not introduce into the heating section any air or gases in addition to the air which has entered the heating section from the work discharge section. Preferably the oven heating is accomplished by electric resistance heaters which warm the air in the heating section, although electric induction coils, which heat the metallic portions of the work, may also be used.

By the use of the electrically actuated heating members it is found that heat is created inside of the oven with the minimum amount of dust, dirt or other foreign substances circulating therein. The oven thus accomplishes another desirable result, namely the baking of a hard surface on a finish coat without foreign substances becoming embedded therein during the travel of the work through the oven and before the hard surface thereon is fully developed.

When induction heat is used, the induction coil 24a is placed as shown in Fig. 10, substantially surrounding the path of the work 23 in the baking section and spaced from the inner wall thereof. Between the inner and outer walls is placed the conventional insulation, the outer wall being spaced from the inner wall by electrically non-conducting supporting members 65 formed of any desired dielectric materials, such for example as porcelain, mica or the like. Thus any eddy currents generated in the wall by the induction coil cannot flow to the outer wall and heat is conserved.

When it is desired to minimize all possibility of stratification of the air flow, suitable baffles 67 may be used inside the oven and outside the induction coil, these baffles being supported from the inner shell by electrically non-conducting ribs or spacing members 67a.

The direction of the air flow in any cross-section of the oven provided with the baffle members 67 will be substantially as shown by the arrows on Fig. 10, the spacing between the baffles 67 and the inner shell functioning somewhat as a chimney wherein the air (heated by the baffle and the inner shell) is forced to rise and is directed through the center opening of the baffles 67 downwardly over the work 23. The baffles 67 are suitably spaced from the inner shell to insure greater heating between the baffle and the inner wall than within the induction coil. Thus the air will be continually circulated and stratification will be prevented.

In certain installations where the problem of suspended dirt becomes of importance, it is possible to place a series of screens or filters 55 in the intake ducts communicating with the blowers and the ducts 47, 48 and 49 at points adjacent the entrance end of the tunnel. In this manner any foreign substances such as dust, dirt or the like which are suspended in the article by reason of the other operations within the oven, are removed from the air stream at the points where the air stream discharges upon the work.

It will be understood from the foregoing that the present invention also produces desirable results in that it provides a completely enclosed oven and a ventilating system therefor which will remove all noxious fumes or gases which may be attendant upon the treatment of the particular object passing therethrough. Therefore, while the present invention is particularly applicable to commercial ovens of the tunnel type which are electrically heated, the invention also is applicable to commercial ovens of the tunnel type which are heated by other means.

The details which may be employed in the construction of an oven embodying the present invention are shown in Figs. 9 to 15 inclusive. As shown in Fig. 9, the interior portion of the oven may be formed from a series of sheet steel plates 60 having turned edge portions which are joined as at 61 by welding or the like. The outer covering of the oven 62 is comprised of plaster, cement or the like in which reenforcing wire 63 is embedded. The heat insulating material 64, such as rock wool or the like, is placed between the outer covering and the inner shell formed by the joined plates 60. In order to hold the outer shell 62 and the inner shell formed by the joined plates 60 in their relative spaced positions, a series of dielectric connecting members 65 are provided which are connected with the reenforcing members 63 at one end and with the joined plates 60 at the other end.

The corner construction is shown in detail in Fig. 12. As there shown, an angle iron member 66 is joined as by shot welding to the sheets 61 used in forming the top and side portions of the inner shell of the tunnel.

A modified form of construction is shown in Figs. 13 to 15 inclusive. As there shown the inner shell of the tunnel is formed of a series of plates 70 which are joined as by shot welding or the like along the adjoining edges and at the corners by means of angle irons 71 similar to the angle iron 66 heretofore described. The outer shell 72 in this embodiment of the invention is also formed of a series of steel plates joined along their abutting edges and reenforced at the corner portions by angle iron members 73. The outer shell 72 is spaced from the inner shell and the intermediate space is filled with insulating material 74. The shells are maintained in spaced apart relation by a series of dielectric connecting members 77 secured thereto.

The two forms of construction herein described are intended only as examples of constructions which may be employed in certain types of installations but are not intended to designate any particular type of construction of the oven with which the present invention may be employed.

I claim:

1. An industrial oven comprising a tunnel-like enclosure having a work baking section heated by electrically actuated induction heating coils, said tunnel comprising spaced apart inner and outer metallic shells, heat insulating material disposed between said shells, and spacing members formed of a dielectric material and secured to said shells to maintain said shells in a predetermined spaced apart relation to each other, said spacing members being effective to prevent a flow of induced electric current from said inner shell to said outer shell.

2. In an industrial oven comprising spaced apart inner and outer shells and having a work baking section, electrically actuated induction heating coils disposed adjacent said work baking section, a metallic baffle structure secured to but electrically insulated from the inner shell of the oven and disposed about the induction heating coils, said baffles and said inner shell, when heated by the action of the said heating coils, causing a flow of air therein in a predetermined direction with substantial freedom from stratification within the enclosure.

3. In an industrial oven comprising spaced apart inner and outer shells and having a work baking section, electrically actuated induction heating coils disposed therein, a metallic baffle structure extending across the top and downwardly adjacent the sides of the said oven and forming a flue or duct with the inner shell of the oven, said baffle being formed to provide an opening adjacent the top of said oven and communicating with said flue or duct to discharge heated air upon work passing through said oven and beneath said opening.

HOWARD E. SOMES.